United States Patent [19]

Giardina

[11] Patent Number: 4,773,023
[45] Date of Patent: Sep. 20, 1988

[54] APPARATUS FOR MEASURING THE RATE OF HEAT DISSIPATION

[76] Inventor: Joseph J. Giardina, 32 Judson, Apt. 14B, Edison, N.J. 08837

[21] Appl. No.: 722,805

[22] Filed: Apr. 12, 1985

[51] Int. Cl.⁴ .................... G01K 17/06; G01K 17/16
[52] U.S. Cl. ..................................... 364/510; 374/41; 374/40
[58] Field of Search ............................ 374/41, 40, 39; 364/510, 557; 73/269, 861.01, 861.02

[56] References Cited

U.S. PATENT DOCUMENTS

| | | | |
|---|---|---|---|
| 3,631,717 | 1/1972 | Kato et al. | 374/40 |
| 3,639,737 | 2/1972 | McKee | 364/510 |
| 3,839,911 | 10/1974 | Zimmerman et al. | 364/510 |
| 3,842,669 | 10/1974 | Iversen | 374/41 |
| 4,224,825 | 9/1980 | Feller | 374/41 |
| 4,250,747 | 2/1981 | Diprose et al. | 364/510 |
| 4,315,523 | 2/1982 | Mahawili et al. | 73/269 |
| 4,403,296 | 9/1983 | Prosky | 364/557 |
| 4,531,843 | 7/1985 | Kühnlein et al. | 374/41 |

FOREIGN PATENT DOCUMENTS

| | | | |
|---|---|---|---|
| 1913874 | 10/1970 | Fed. Rep. of Germany | 374/41 |
| 0148677 | 6/1981 | German Democratic Rep. | 374/41 |
| 1254423 | 11/1971 | United Kingdom | 364/510 |
| 1546507 | 5/1979 | United Kingdom | 364/510 |

Primary Examiner—Parshotam S. Lall
Assistant Examiner—Brian M. Mattson
Attorney, Agent, or Firm—Thomas L. Adams

[57] ABSTRACT

Apparatus for measuring the rate of sheet dissipation from a load immersed in a flowing fluid includes an upstream and downstream transducer. These transducers are located upstream and downstream of the load for providing an upstream and downstream signal signifying the temperature of the fluid upstream and downstream, respectively, of the load. A flow transducer is located in the flow of the fluid for providing a flow signal signifying the flow rate of the fluid. A processor is coupled to the flow transducer and the upstream and downstream transducer for providing a power signal proportional to the flow signal and to the difference between the downstream and upstream signal.

10 Claims, 4 Drawing Sheets

APPARATUS FOR MEASURING THE RATE OF HEAT DISSIPATION

BACKGROUND OF THE INVENTION

The present invention relates to calorimetric equipment, and in particular, to equipment for measuring the product of temperature change and fluid flow rate around a heat dissipating load.

It is known to make a calorimetric measurement by measuring the temperature change in a fluid flowing past a heat dissipating load. The heat rate is proportional to the flow rate multiplied by the temperature difference. For example, in the broadcast industry a power measurement is often performed by enclosing a special resistor in a water conduit. The equipment includes temperature sensors and flowmeters to allow direct measurement of the flow rate and temperature change. A typical measurement process involves calculating the power when the energy to the load is increased to represent 80, 100 and 110 percent of the rated power for the broadcast transmission. When the power is set at these points, a meter ordinarily used to measure power can then be accurately calibrated for these set points.

A disadvantage with this type of calibration procedure is the relatively long time required to manually adjust power and then to calculate power dissipation. Another disadvantage is that these systems must be operated carefully so that power is not placed into a load while the water is stagnant. Otherwise, the relatively expensive load impedance can be quickly burned out.

It is known to construct power meters with thermocouples so that the power can be measured as a function of the heat generated. However, these apparatus have not been designed for relatively high power applications where a flowing fluid must conduct away excess test.

Accordingly, there is a need for a precise and simplified technique for calibrating and measuring power.

SUMMARY OF THE INVENTION

In accordance with the illustrative embodiment demonstrating features and advantages of the present invention, there is provided apparatus for measuring the rate of heat dissipation from a load immersed in a flowing fluid. The apparatus has an upstream and downstream transducer located upstream and downstream, respectively, of said load. These two transducers can provide an upstream and downstream signal signifying the temperature of said fluid upstream and downstream, respectively, of said load. The apparatus also includes a flow transducer located in the flow of the fluid for providing a flow signal signifying the flow rate of said fluid. Also included is a processing means coupled to the flow transducer and the upstream and downstream transducers for providing a power signal proportional to the flow signal and to the difference between the downstream and upstream signal.

By employing equipment of the foregoing type a highly improved apparatus is achieved. In a preferred embodiment, upstream and downstream temperature transducers provide input signals through an analog to digital converter, to a microprocessor. This preferred embodiment also receives a flow transducer signal that is fed into a computer readable counter, as another factor in the measurement equation. The microprocessor can interface with a portable computer that acts as a terminal to start the microprocessor and to change some of its variables.

In this preferred embodiment, the microprocessor commands increasing application of a source of power to a load resistor located in the path of a fluid stream until a desired level is reached. Preferably, the load is driven successively to 20, 50, 80 and 100 percent of the rated load.

This preferred embodiment includes an interlock so that certain systems must be in a safe condition before the process is allowed to proceed. For example, a minimum flow rate must be indicated by a flow transducer before closing a relay to couple power to the load resistor.

By using equipment of the foregoing type, the labor involved in performing such a measurement is greatly reduced.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENT

Figure 1:
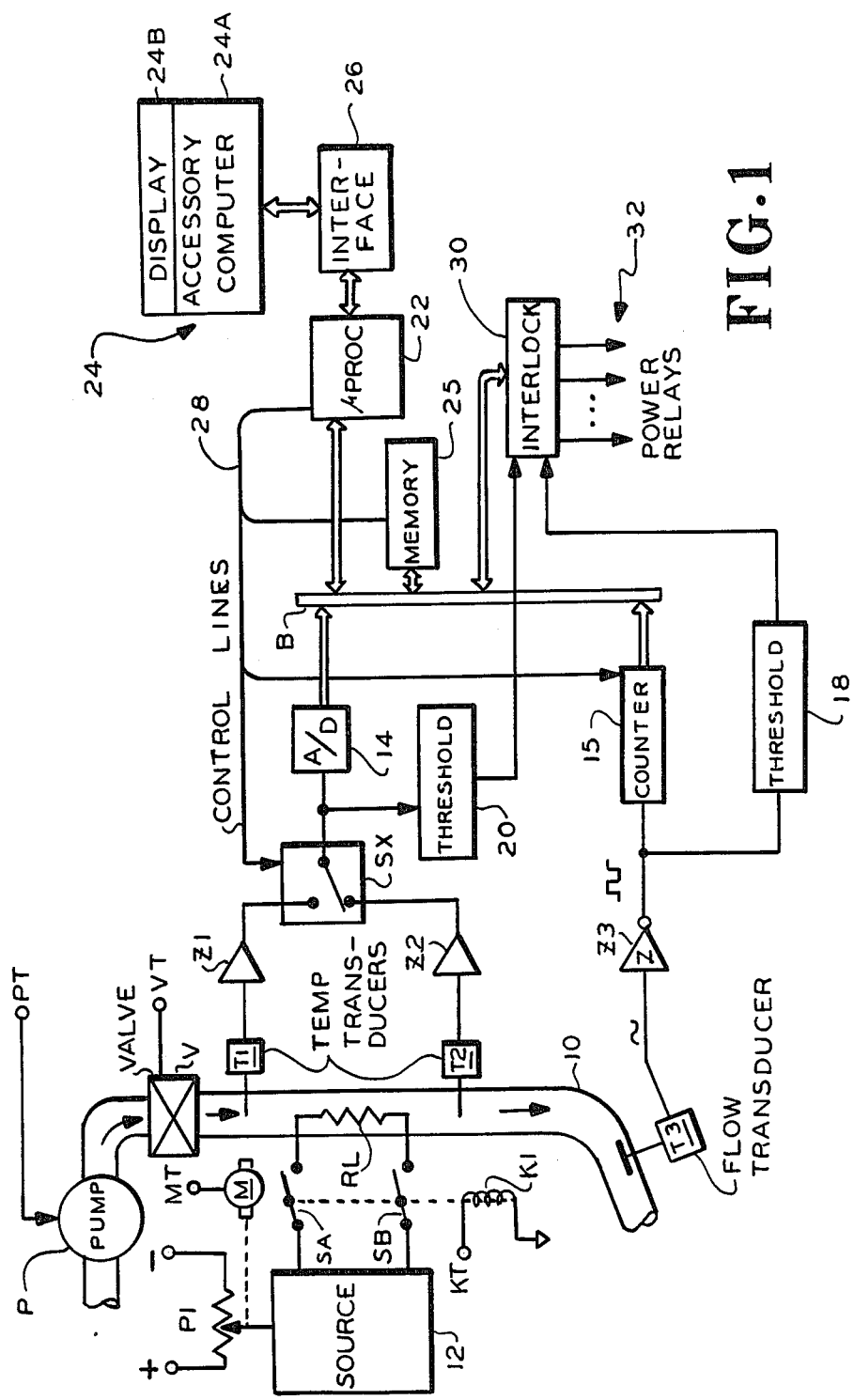
FIG. 1 is a schematic diagram of apparatus according to the principles of the present invention.

Referring to FIG. 1, this apparatus includes water conduit 10 through which water is circulated by means of pump P. Conduit 10 may be part of a closed loop in which excess heat is removed by a radiator (not shown). Pump P can be turned on by a high signal at terminal PT, which is a control terminal that does not need relatively high power to operate pump P. The discharge port of pump P connects to solenoid operated valve V (referred to as a regulation means) and having a control terminal VT for opening and closing the valve. Immersed in the water of conduit 10 is a load dissipating resistor RL. Resistor RL is in this embodiment designed to dissipate relatively large amounts (hundreds of kilowatts) of radio frequency (RF) power. Resistor RL is connected through the contacts SA and SB of a double pole single throw relay, including relay coil K1. The relay connects load resistor RL to a source means, shown herein as source of RF energy 12. Source 12 can be the power amplifier and exciter stages of broadcast equipment that is to be calibrated. A control terminal of source 12 is connected to the wiper of potentiometer P1 whose outer terminals are connected to a positive and negative reference potential. Adjustment of the wiper of potentiometer P1 changes the power output from source 12 in a known manner. The wiper of potentiometer P1 is mechanically connected to stepper motor MT which is designed to cycle the wiper of potentiometer P1 in response to pulses applied to terminal MT of motor M.

Inserted into conduit 10, upstream and downstream of load RL, are the probes of upstream transducer T1 and downstream transducer T2, respectively. These transducers can be formed from a conventional thermistor or thermocouple designed to produce a voltage output that varies in accordance with the temperature sensed by the transducer. The outputs of transducers T1 and T2 are coupled to the input of an FET switch, shown herein only schematically employing amplifiers Z1 and Z2, respectively, whose outputs connect to the selectable terminals of selector switch SX. Switch SX may be an electronic switch and may employ, for example, a pair of FET transistors connected to produce the function illustrated by switch SX. The selecting pole of switch SX is connected to the input of analog to digital converter 14 whose output connects to bus B. Converter 14 is of a conventional type designed to produce an ten bit word signifying the magnitude of the analog signal applied to its input.

An optional threshold detector 20 is illustrated but will not be used in many embodiments. The input to converter 14 is connected also to the input of threshold detector 20 which is a simple comparator that provides a high output whenever the input to converter 14 exceeds a predetermined limit value, indicative of excessive temperature in the fluid system.

A flow transducer T3 is installed to communicate with conduit 10 at a position downstream of resistor RL, although other positions are usable. In this embodiment transducer T3 contains an impeller (not shown) that is driven by fluid flowing past it. The rotation of the impeller operates a generator (not shown) to produce an alternating signal whose frequency is proportional to the flow rate. The output of transducer T3 is connected to the input of comparator Z3 whose output is a square wave at the same frequency as its input. This square wave from comparator Z3 is applied to a counter that is allowed to counter 15 to a value indicative of the frequency or flow rate. A processing means is shown herein as microprocessor 22, an eight bit microprocessor manufactured by Hewlett Packard although other microprocessor types or other computers may be employed instead. Microprocessor 22 is also connected to bus B as is a memory means 25, shown herein as a read only memory and random access memory having a total memory of approximately 4 kilobytes.

Processor 22 is connected to a terminal means 24A and display means 24B in the form of a portable (accessory) computer 24 such as a Hewlett Packard type HP41C. The accessory computer 24 is connected to microprocessor 22 through an interface 26, for example, a Hewlett Packard interface loop manufactured by Hewlett Packard to operate with portable accessory computer 24.

Microprocessor 22 has control lines 28 that connect to memory 25, counter 15 and switch SX. Through these lines, processor 22 can change the read/write state of memory 25, can reset counter 15 and can change the state of switch SX according to a preprogrammed schedule.

Figure 2:
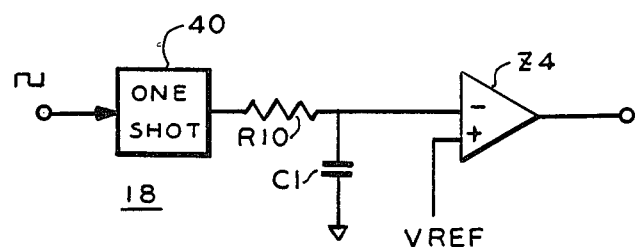
FIG. 2 is a schematic diagram of a flow threshold detector employed in the apparatus of FIG. 1.

An interlock means 30 is shown herein connected for receiving output from microprocessor 22 and outputs from threshold detector 18 (and if used, threshold detector 20). Threshold detector 18 is illustrated in simplified form in FIG. 2 and in a more practical form in FIG. 4. Detector 20 provides a low signal whenever the values measured by it have reached an unacceptable range, through the use of equipment such as a comparator. Microprocessor 22 provides the primary control commands which are translated through relays (shown hereinafter) into appropriate signals at the lines 32. These outputs 32 connect to terminals such as terminal PT (for starting pump P); terminal VT (for opening or closing valve VT); terminal KT (for energizing or deenergizing relay coil K1); and terminal MT (for stopping motor M). Referring to FIG. 2, it shows a circuit diagram for the detector 18 of FIG. 1. (Of course another embodiment is given in FIG. 4.) The detector includes one-shot multivibrator 40 which provides for each cycle of the square wave applied to its input, a relatively narrow pulse (for example, 10 microseconds). Each pulse from multivibrator 40 is applied into the integrating network comprising serially connected resistor R10 and capacitor C1, the latter being charged to a value proportional to the frequency of the repetition rate of multivibrator 40. The voltage charge on capacitor C1 is supplied to the inverting input of comparator Z4 whose noninverting terminal is connected to a reference potential. Accordingly, a relatively low frequency causes few pulses from multivibrator 40 so that a consequently low voltage on capacitor C1 produces a high signal from comparator Z4.

Figure 3:
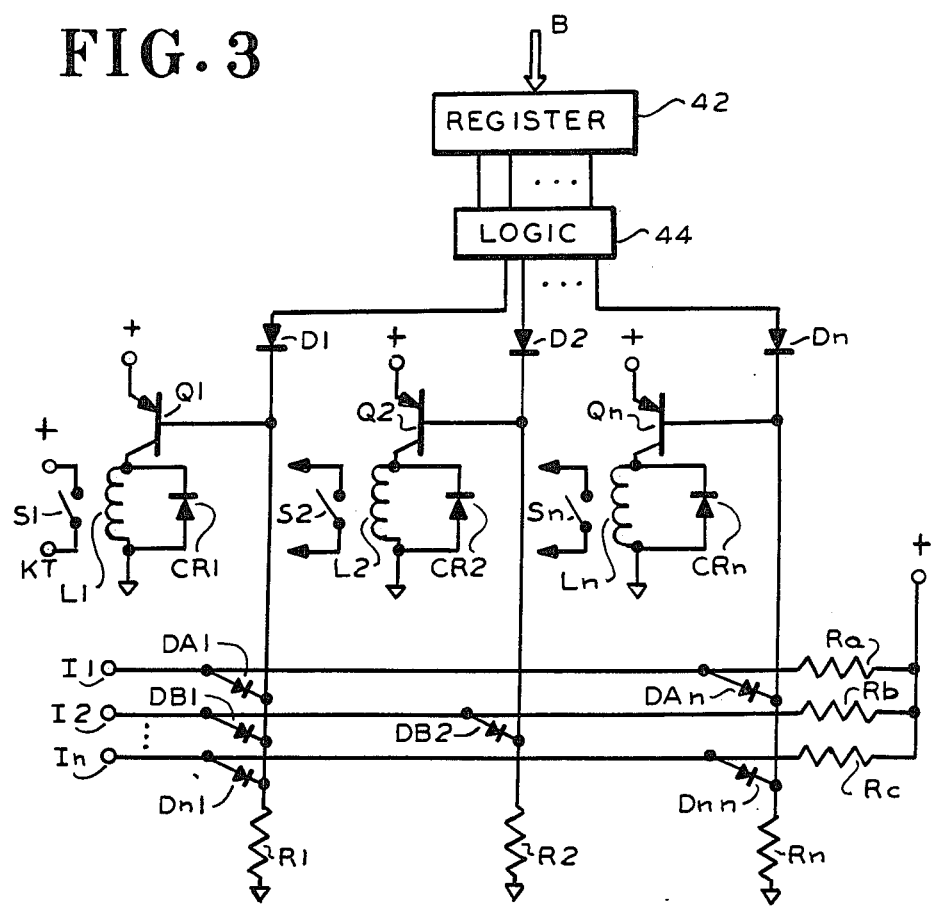
FIG. 3 is a detailed schematic of the control block of FIG. 1.

Referring to FIG. 3 the details of the control circuit, acting as an interlock means, is illustrated. A register 42 is connected to bus B to receive the status bits issued by the microprocessor. Each of these bits are converted by combinational logic circuit 44 into a command signal at the output of circuit 44. For example, in the simplest embodiment, the 8 bits in register 42 can each indicate whether a separate control device is to be on or off, in which case then logic circuit 44 simply provides direct connections. Each of the output lines of logic circuit 44 connects to the anode of blocking diodes D1, D2 ... Dn whose cathodes connect to the bases of PNP transistors Q1, Q2 ... Qn, respectively. It will be appreciated that the dotted lines in the schematic indicate the possibility of duplicating stages of the illustrated circuitry. With their emitters connected to positive potential, the collectors of transistors Q1, Q2 ... Qn are connected to the cathodes of blocking diodes CR1, CR2 ... CRn, respectively, whose anodes are grounded. Connected in parallel with these diodes are relay coils L1, L2 ... Ln, respectively, which drive relay contacts S1, S2 ... Sn, respectively. These contacts constitute the outputs of the interlock means.

The bases of transistors Q1, Q2 ... Qn are connected to one terminal of resistors R1, R2 ... Rn, respectively, whose other terminals are grounded. Interlock input lines I1, I2 ... In each have a pull-up resistor Ra, Rb ... Rc and form a matrix with the lines from the bases of the transistors Q1, Q2 ... Qn. For example, the base of transistors Q1 connects to the cathodes of diodes DA1, DB1 ... Dn1 whose anodes connect to lines I1, I2 ... In, respectively. This suggests a diode at each intersection, which may be desirable when all possible conditions must be satisfied before energizing a particular relay, but such complete checking is not always necessary and will not be the case for all relays. In this embodiment a ground connection to terminals I1, I2 ... In reverse biases diodes DA1, DB2 ... Dn1 and allows transistor Q1 to conduct if a low signal is applied to the anode of diode D1 to reverse bias it as well. Under these circumstances base current is allowed to flow through resistor R1 so that transistor Q1 conducts to energize of relay coil L1 and close switch S1. This enables application of driving potential to the appropriate device being controlled by that relay.

It will be seen therefore that a command to close relay contacts S1, S2 ... $S_n$ from the computer bus B, as stored in register 42, is not effective until the associated interlock signal is applied as a grounding signal to the appropriate one of the terminals I1, I2 ... $I_n$. To facilitate an understanding of the principles associated with the apparatus of FIGS. 1-3, its operation will be described in connection with the flowchart of FIG. 4. Initially, valve V is closed, pump p is not operating, potentiometer P1 is at a position to produce minimum output from source 12 and contacts SA and SB are open. Consequently, a relatively low and equal output are produced from transducers T1 and T2. Similarly, no output is produced from flow transducer T3. An operator may now load into microprocessor 22 through accessory computer 24 either a stored program or one typed manually onto the keyboard of computer 24. The program is loaded through interface 26 and then conveyed through processor 22 into memory 25. Thereafter, processor 22 may receive operator commands by computer 24. For example, the operator can define the various calibration values of power to be delivered to load resistor RL and then command processor 22 to run its stored program as indicated by step ST1 in FIG. 4.

At step ST2, processor 22 sends to register 42 in interlock 30 status signals requiring that valve V open and pump P start. Similarly, motor M is driven to a minimum position so that source 12 produces a minimum output.

To accomplish these results, processor 22 issues the appropriate status signals through bus B to register 42 which is then converted to the appropriate on/off signals at the output of logic circuit 44 (FIG. 3). In this embodiment, transistor Q2 can operate pump P and valve V. To operate them, logic circuit 44 applies a low signal to the anode of diode D2 thereby reverse biasing it. Provided that no high interlock signals are otherwise provided to the base of transistor Q2, its base emitter junction may be forward biased to energize relay coil L2 and close switch S2, thereby applying an appropriate signal to start pump P and open valve V. Should a high interlock signal be received however, along line I2, for example, diode DB2 is forward biased to apply a high potential to resistor R2. This high signal (possibly produced by pull-up resistor Rb acting on an open circuit) can reverse bias transistor Q2 and keep current from flowing in its collector, thereby keeping relay coil L2 deenergized.

Thereafter, in step ST3, microprocessor 22 stores the time signal generated by its internal clock (not shown), the temperatures from transducers T1 and T2 and the flow rate from tranducer T3, in a temporary storage area. In step ST4, microprocessor 22 compares the latest measured values to limit values stored in memory 25. If these are within allowable limits, then step ST5 is next executed wherein the condition of power relay K1 is determined. If power relay K1 has not yet been energized then step ST6 is now executed. Consequently, microprocessor 22 issues a status signal through bus B which is latched into register 42 of the interlock (FIG. 3). In this embodiment transistor Q1 is concerned with energizing relay K1 (FIG. 1). Accordingly, a low signal is issued to the anode of diode D1, causing it to be reverse biased. Provided that low signals are applied to lines I1, I2 ... $I_n$, then diodes DA1, DB1 ... DN1 are also reversed biased. Consequently, no disturbing voltage is applied to resistor R1. Therefore, the base-emitter junction of transistor Q1 is forward biased so that collector current flows through relay coil L1 to close switch S1. Switch S1 in this embodiment is connected to contact KT of relay coil K1 (FIG. 1) to energize relay coil K1 and close contacts SA and SB. Thereafter, a small amount of power flows from source 12 to load resistor RL.

Thereafter, in step ST7 the target value Pn for power to load RL, is incremented from zero. The first target value of power Pn is set at 80% of the rated value. Step ST8 determines whether n is the maximum value, which at this point it is not.

Accordingly, step ST3 is repeated wherein the prior recorded value of time, temperature and flow rate are replaced with current values. However, when step ST5 if reached, control is transferred to step ST9 wherein it is determined whether an excessive amount of time has elasped since the incrementing of Pn. Since the elapsed time cannot be excessive at this point, step ST10 is next executed wherein the value $Pa = kF(Td - Tu)$ is calculated; wherein Pa is the actual power, k is a constant, F is the flow rate, Tu is the temperature upstream and Td is the temperature downstream. After being calculated, the actual power value is displayed by the microprocessor transferring through interface 26 the present value for display on display 24B (FIG. 1).

Step ST11 next determines whether the current value of power Pa is excessive. If it is not, step ST12 is executed wherein an adjustment variable is calculated as a predetermined function of the difference between the actual power (Pa) minus the target power (Pn). In this embodiment, the adjustment value is incremented (decremented) by an amount proportional to the change in the error signal, Pa-Pn. Accordingly, microprocessor 22 issues through bus B a successive number of commands to increment the adjustment signal. In response, register 42 has the bit associated with motor M set and reset to cause stepping. Thus, transistor Qn can be turned on and off to close switch Sn repetitively. Switch Sn is, in this example, connected to terminal MT of stepper motor M (FIG. 1). Consequently, the wiper of potentiometer P1 is moved a given amount in accordance with the error signal. In step ST13, the actual power Pa is compared to the target value Pn. If these values are not equal and did not remain equal for 10 seconds, control is returned to step ST3 so that steps ST4, ST5, ST9, ST10 and ST11 can be repeated. Again at step ST12 the adjustment signal is varied depending upon the error signal. As the measured power increases, the error and thus the changes to the adjustment signal are reduced. Eventually, the actual power Pa remains equal to the target power Pn for 10 seconds. Therefore, at step ST13 the program stops and awaits further commands. At this time the operator can calibrate his meters and note their accuracy. Then the operator can issue a command to continue through computer 24 so that step ST7, is next executed. At step ST7, the next target power is loaded from memory 25 or from terminal 24. Provided this latest target is permissible, step ST8 leads to step ST3 and the cycle repeats.

Should the flow rate be insufficient or the temperatures be excessive, at step ST4, control is switched to step ST14 wherein a branching decision is made depending on whether this is the first violation. If this is the first violation, step ST3 is again executed. Otherwise, an alarm signal is issued at step ST15 and processor 22 conveys through interface 26 an alarm signal displayed on display 24B. Thereafter, in step ST16, processor 22 issues a command through interlock 30 to open power relay K1 and set the wiper of potientiometer P1 at a minimum setting. Thereafter the program ends.

Steps ST15 and ST16 are also executed when violations are found in steps ST9 or ST11 when an excessive amount of time has been spent attempting to reach the target power value or when the actual calculated power value is excessive. Finally, step ST16 is executed to end the program when the last target power value has been processed, whereby control is transferred through step ST8 to step ST16.

Figure 5:
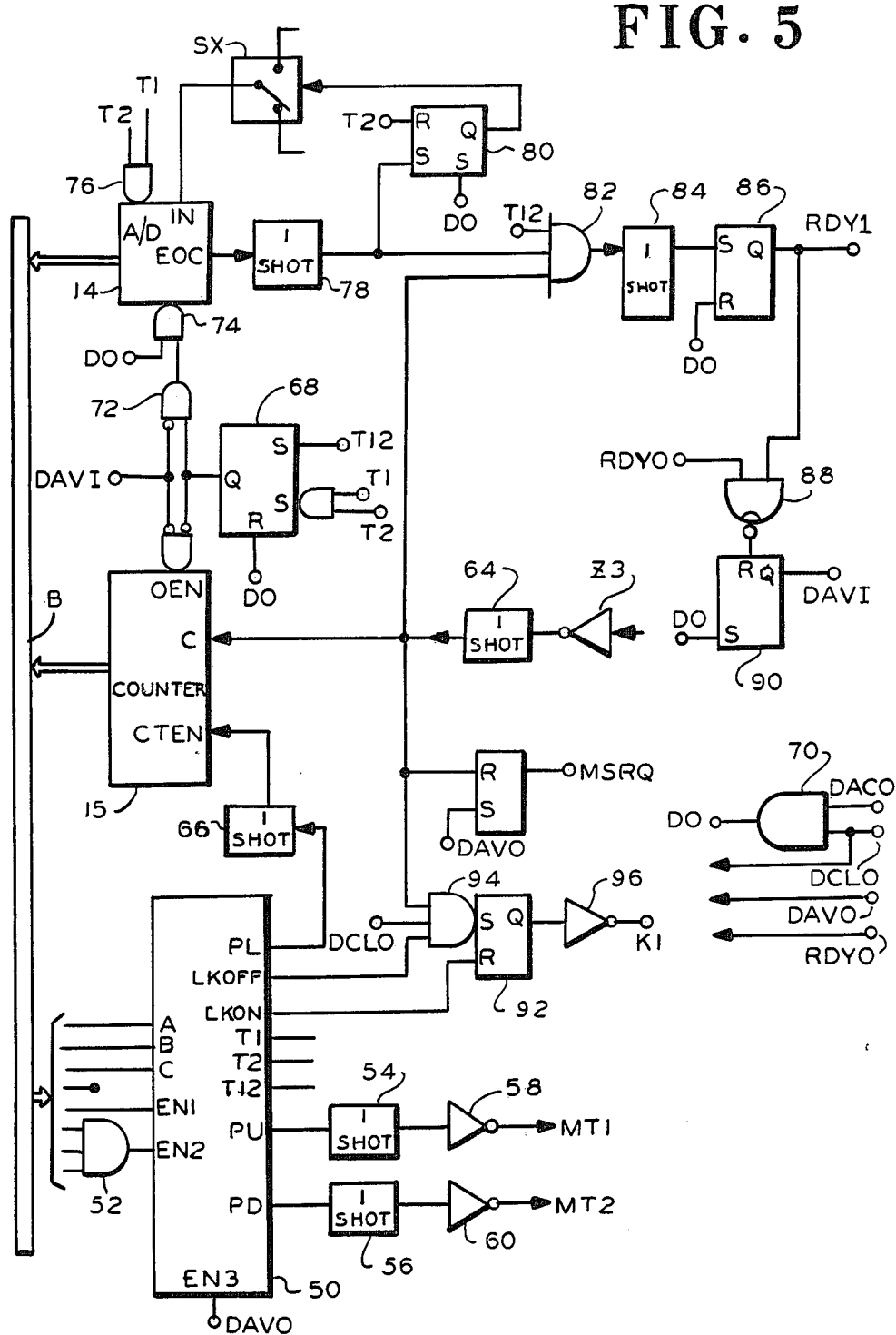
FIG. 5 is a schematic diagram showing an alternate interlock.

Referring to FIG. 5, it shows an alternate interlock employing a decoder 50 coupled to bus B. Decoder 50 has three enable inputs EN1, EN2, and EN3 connected to one of the lines of bus B, the output of AND gate 52 and control line DAVO from microprocessor 22 (FIG. 1), respectively. Three other lines from bus B connect to the triple inputs of gate 52, still three others being connected to the data inputs A, B and C of decoder 50. Decoder 50 is an 8 out of 3 decoder producing a single low output on the line selected by inputs A–C.

Two outputs of decoder 50, lines PU and PD connect to the inputs of one-shots 54 and 56, respectively, whose outputs connect through inverters 58 and 60 to terminals MT1 and MT2. These terminals control the direction of rotation of motor M (FIG. 1) by commanding slewing in the selected directions.

Previously mentioned counter 15 is shown with its counting input C connected to the output of one-shot 64 which is driven by previously mentioned driver Z3. Also, count enable terminal CTEN is connected to the output of one-shot 66 whose input is driven by line FL of decoder 50. Counter 50 has a pair of inverting, ANDed inputs marked OEN, one such input being connected to the Q output of flip flop 68, the other such input connected to terminal DAVI described hereinafter. Flip flop 68 has one set input S connected to line T12 of decoder 50, its ANDed input being connected to lines T1 and T2 of the decoder. The reset input R of flip flop 68 connects to line DO, the output of AND gate 70 whose inputs connect to lines DACO and DCLO, computer control lines.

The output Q of flip flop 68 also connects to one input of AND gate 72 whose inverting input connects to line DAVI and whose output connects to one input of AND gate, whose other input connects to line DO. Gate 74 connects to analog to digital converter 14 to control its operation, together with controlling AND gate 76 whose inputs connect to lines T1 and T2 of decoder 50. An end of conversion signal on line EOC of converter 14 drives one shot 78, whose output drives the set input S of flip flop 80. Flip flop 80 has its reset input R connected to line T2 and its Q output connected to the control terminal of FET switch SX, mentioned earlier. The switching pole of switch SX connects to analog input IN of converter 14, whose digital outputs connect to bus B.

Various end of conversion signals connect to the inputs of AND gate 82: terminal T12, and the outputs of one shots 64 and 78. An end of conversion one shot has its input connected to the output of gate 82 and its output connected to set input S of flip flop 86, whose reset input R connects to line DO. The output Q of flip flop 86, line RDYL, connects to the inverting input of AND gate, whose other input connects to computer control line RDYO. Flip flop 90 has its output Q, its set input S and its reset input R connected to line DAVI, line DO and the output of gate 88, respectively.

Figure 4:
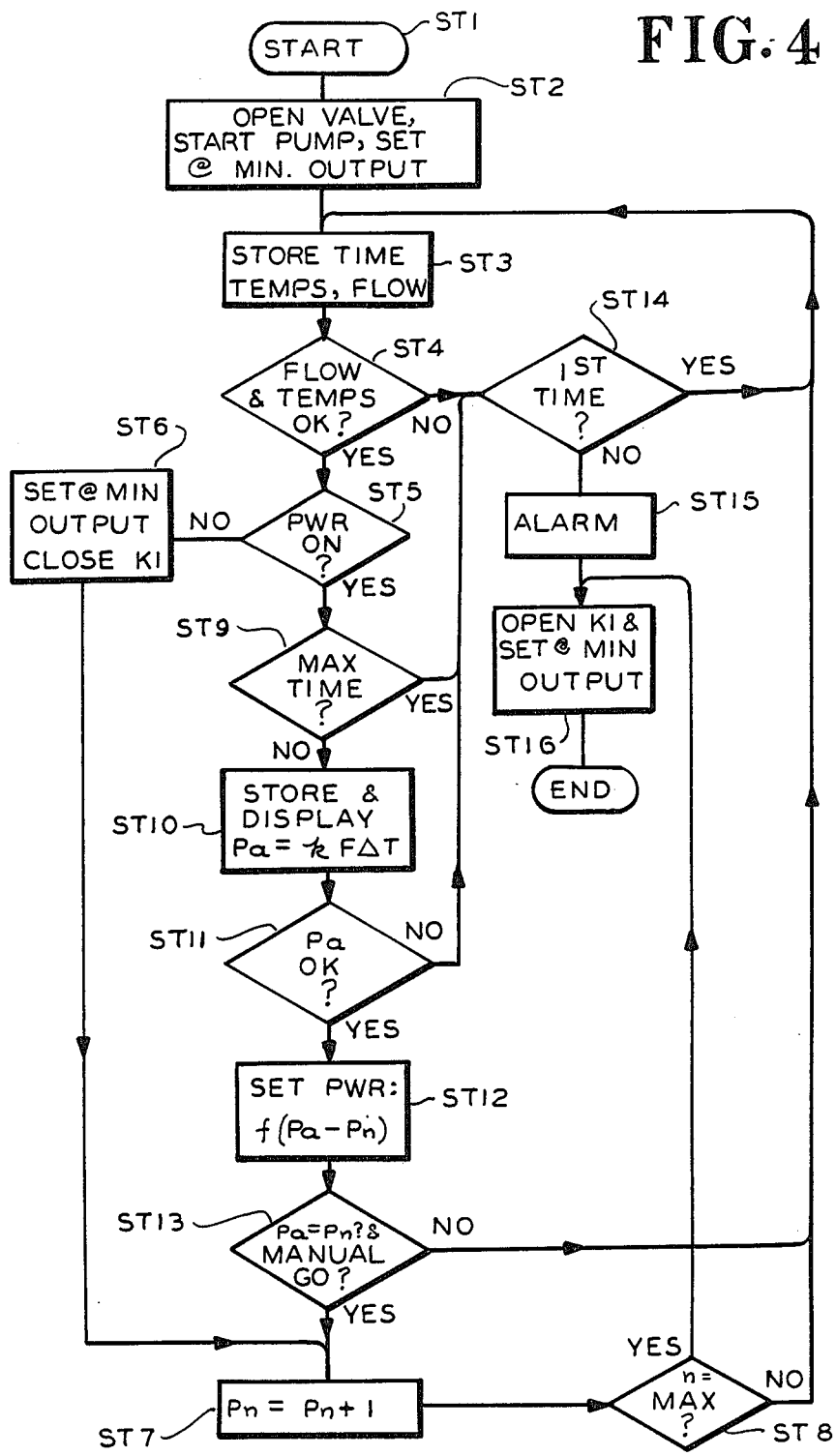
FIG. 4 is a flow chart associated with the processor of FIG. 1.

In operation, the decoder 50 of FIG. 4 responds to selection signals to generate a single output. For example, lines PU or PD enable the potentiometer motor M (FIG. 1) to adjust the R.F. output.

Importantly, flip flop 92 can be set to provide through driver 96, a signal that causes relay K1 (FIG. 1) to open. For one case, the LKON and LKOFF lines of decoder 50 can reset and set, respectively, by flip flop 92, but as will become clear hereinafter, the resetting is subject to immediate cancellation by the other interlocking circuits described presently. AND gate 94, connected to flip flop 92 to perform an OR function, is driven by lines LKOFF and DCLO and the output of one shot 64. Thus any of these devices can peremptorily disconnect relay K1, an important feature since improper closing of that relay can damage the previously mentioned load resistor.

One shot 64 responds to the square wave of driver Z3 to provide a continuously high signal unless the repetition frequency declines below an unacceptable level indicating poor cooling fluid flow. Accordingly, relay K1 is quickly disabled without reliance on the computer or other supporting circuitry.

If fluid flow measurements are needed the computer issues a bus signal to select line FL and trigger one shot 66 for a measurement interval. Thereafter, pulses from one shot 64 are counted by counter 15 for the one shot's interval. Then an end of conversion signal is applied through gate 82 to one shot 84 to produce the appropriate hand-shaking signals RDYL and DAVI in connection with control lines RDYO and DO. Similarly flip flop 92 produces control signal MSRQ in connection with line DAVO. Next in response to the output of flip flop 68, provided line DAVI is in the proper state, counter 15 is enabled to issue its digital count.

In a similar fashion, line T1 or T2 can be selected to set flip flop 80 and thus switch SX. At this time flip flop 68 is set to enable converter 14 through gates 72 and 74, lines DAVI and DO providing the proper coordination with the computer. Thereafter converter 14 obtains ten bits of data. The first eight are issued when the end of conversion signal from flip flops 78 and 84 issue the previously mentioned control signals. The issuing of the last two bits are regulated by line T12 acting through gate 74.

It is to be appreciated that various modifications may be implemented with respect to the above described preferred embodiment. For example, the various digital circuits may be replaced with appropriate analog circuitry. Thus, a counter can be replaced with a capacitive device that is repetitively charged to produce a counting effect. Similarly, the various transducers can be replaced with alternate transducing devices. Furthermore it will be understood that the interlocking scheme can be modified depending upon the safety requirements of the system. In some embodiments no interlocking will be employed. Also, while a pair of computing devices is shown, in some embodiments a single processor will be employed having its own dedicated display. Also, while calibrating a power source is disclosed, general calibration of other equipment is contemplated. Moreover, while various electrical components are illustrated, it will be understood that the type and rating of the components can be altered depending upon the desired speed, power capacity, temperature stability, simplicity, etc.

Obviously, many modifications and variations of the present invention are possible in light of the above teachings. It is, therefore, to be understood that within the scope of the appended claims, the invention may be practiced otherwise than as specifically described.

What is claimed is:

1. Apparatus for measuring a rate of heat dissipation from a load immersed in a flowing fluid, comprising:
   an upstream and downstream transducer located upstream and downstream, respectively, of said load for providing an upstream and downstream signal, respectively, signifying a temperature of said fluid upstream and downstream, respectively, of said load;
   a flow transducer located in said fluid for providing a flow signal signifying a flow rate of said fluid;
   processing means coupled to said flow transducer and said upstream and downstream transducer for providing a power signal proportional to a product of said flow signal and to a difference between said downstream and upstream signal;
   source means having an adjust terminal and being coupled to said load for applying to it power regulated by a signal on said adjust terminal, said processing means being coupled to said adjust terminal to provide to it an adjust signal that is a function of said power signal; and
   interlock means coupled to said source means and said flow transducer for stopping application of power to said load in response to said flow signal reaching a predetermined magnitude signifying insufficient fluid flow, said interlock means operating independently of said processing means so that power is removed notwithstanding any failure of said processing means.

2. Apparatus according to claim 1 wherein said processing means is operable to adjust said adjust signal in a direction to bring said power signal toward a predetermined value.

3. Apparatus according to claim 2 further comprising:
   terminal means coupled to said processing means for changing said predetermined value; and
   display means coupled to said processing means for displaying said power signal.

4. Apparatus according to claim 2 comprising:
   means coupled to said upstream and downstream transducer for stopping application of power to said load in response to either one of said upstream or downstream signal reaching predetermined respective maximums signifying excessive temperatures.

5. Apparatus according to claim 2 wherein said interlock means is coupled to said upstream and downstream transducer for stopping application of power to said load in response to either one of said upstream or downstream signal reaching predetermined respective maximums signifying excessive temperatures.

6. Apparatus according to claim 5 further comprising:
   memory means coupled to said processing means for storing instructions therefor.

7. Apparatus according to claim 6 further comprising:
   regulation means coupled to said interlock means for starting fluid flow at said load in response to instructions of said memory means.

8. Apparatus according to claim 7, wherein said processing means is operable to vary said adjust signal as a predetermined function of the difference between said power signal and present magnitude of said predetermined value.

9. Apparatus according to claim 8 wherein said processing means is operable to multiply said flow signal times the difference between said downstream and upstream signal.

10. Apparatus according to claim 9 wherein said memory means contains a plurality of target values for said power signal, said processing means being operable to vary said adjust signal to drive said power signal to successive ones of said target values.

* * * * *